United States Patent [19]

Sakaguchi et al.

[11] Patent Number: 4,551,774
[45] Date of Patent: Nov. 5, 1985

[54] METHOD FOR SELECTING DESIRED PIECE OF INFORMATION RECORDED IN MAGNETIC TAPE MOUNTED IN MAGNETIC TAPE RECORDER AND/OR REPRODUCER

[75] Inventors: Shouzaburou Sakaguchi; Yoshiharu Ueki, both of Kawagoe, Japan

[73] Assignee: Pioneer Electronic Corporation, Tokyo, Japan

[21] Appl. No.: 660,244

[22] Filed: Oct. 12, 1984

Related U.S. Application Data

[63] Continuation of Ser. No. 353,349, Mar. 1, 1982, abandoned.

[30] Foreign Application Priority Data

| Mar. 2, 1981 [JP] | Japan | 56-29570 |
| Mar. 2, 1981 [JP] | Japan | 56-29571 |
| Mar. 5, 1981 [JP] | Japan | 56-31486 |

[51] Int. Cl.[4] .............................................. G11B 15/00
[52] U.S. Cl. .................................... 360/72.1; 360/74.4
[58] Field of Search ............................. 360/72.1, 74.4

[56] References Cited

U.S. PATENT DOCUMENTS

| 4,048,659 | 9/1977 | Fink, Jr. et al. | 369/50 |
| 4,228,471 | 10/1980 | Shiga | 360/73 |
| 4,365,278 | 12/1982 | Takizawa et al. | 360/72.1 |
| 4,367,498 | 1/1983 | Kitamura et al. | 360/72.1 |
| 4,380,031 | 4/1983 | d'Alayer de Costemore d'arc | 360/74.1 |
| 4,404,604 | 9/1983 | Ueki et al. | 360/71 |

FOREIGN PATENT DOCUMENTS

| 54-51807 | 4/1979 | Japan | 360/72.1 |
| 55-52568 | 4/1980 | Japan | 360/72.1 |
| 56-134338 | 10/1981 | Japan | 360/72.1 |
| 57-113439 | 7/1982 | Japan | 360/72.3 |
| 57-143773 | 9/1982 | Japan | 360/71 |
| 57-143774 | 9/1982 | Japan | 360/71 |
| 57-147176 | 9/1982 | Japan | 360/90 |

*Primary Examiner*—George G. Stellar
*Attorney, Agent, or Firm*—Fleit, Jacobson, Cohn & Price

[57] ABSTRACT

A method for selecting a desired piece of information recorded in a magnetic tape mounted in a magnetic tape recorder and/or reproducer while reproducing the information, the magnetic tape recorder and/or reproducer having a magnetic head, a tape transport, and a mechanism controller adapted to actuate the magnetic head and the tape transport to perform selectively one of mode operations including PLAY, CUE and RVW mode operations. The method comprises a first step of causing the mechanism controller to perform the CUE or RVW mode operation while detecting the output signal from the magnetic head to find a leading edge of an information carrying tape portion, a second step of causing the mechanism controller to perform the PLAY mode operation which is initiated from a tape portion adjacent to and upstream of the leading edge of the information carrying tape portion for a certain period after finding the leading edge, a third step of causing the mechanism controller to repeat the first and second steps until a manual stop command is given during the period, and a fourth step of causing the mechanism controller to perform the PLAY mode operation even after the period in case a manual stop command is given during the period.

6 Claims, 17 Drawing Figures

METHOD FOR SELECTING DESIRED PIECE OF INFORMATION RECORDED IN MAGNETIC TAPE MOUNTED IN MAGNETIC TAPE RECORDER AND/OR REPRODUCER

FIELD OF THE INVENTION

The present invention relates to a method for selecting a desired piece of information recorded in a magnetic tape set in a magnetic tape recorder and/or reproducer while reproducing the information, the magnetic tape recorder and/or reproducer having a magnetic head, a tape transport and a mechnism controller adapted to actuate the magnetic head and the tape transport to perform selectively one of mode operations including PLAY, CUE and RVW mode operations. The PLAY mode operation is a normal reproduction operation; the CUE and the RVW mode operations are quick transport mode operations in which a magnetic tape on the tape transport is quickly transported by the tape transport in a forward and a backward direction, respectively, while the magnetic head lightly attaches the magnetic head.

BACKGROUND OF THE INVENTION

A magnetic tape has sometimes pieces of information, for example, pieces of music which are recorded in portions of the tape spaced apart from each other along the length of the tape. The intervening blank portions of the tape between the information carrying portions of the tape sometimes have quite long lengths.

In a prior art magnetic tape recorder and/or reproducer, repetition of manual operations is necessitated to cause the recorder and/or reproducer to successively perform the PLAY and the quick transport mode operations in the forward and backward directions for selecting a desired piece of information, for example, a piece of music. This prior art recorder and/or reproducer has a drawback that the troublesome manual operations must be repeated until the desired information piece is found and it takes a relatively long time to repeat the manual operations. Furthermore, particularly when the recorder and/or reproducer is mounted in a motorcar, repeating such manual operations may bring about dangers to the driver.

In another prior art magnetic tape recorder and/or reproducer which is capable of quickly transporting the magnetic tape in the forward direction to automatically set the magnetic head at the leading edge of an information carrying tape portion in response to a manual command operation, such a manual command must be repeated until the leading edge of a tape portion carrying a desired piece of information reaches the magnetic head for selecting the desired information piece. This prior art recorder and/or reproducer also has the same drawback as that encountered in the prior art recorder and/or reproducer as described above.

Another prior art magnetic tape recorder and/or reproducer is capable of quickly transporting the magnetic tape in the backward direction to automatically set the magnetic head at a leading edge of an information carrying tape portion in response to a manual command operation. Also in this recorder and/or reproducer, the manual command must be repeated for selecting the desired piece of information. This prior art recorder and/or reproducer also has the same drawbacks as that encountered in the prior art recorder and/or reproducers as described above.

SUMMARY OF THE INVENTION

An object of the present invention is to provide a method for selecting a desired piece of information recorded in a magnetic tape set in a magnetic tape recorder and/or reproducer while reproducing the information, in which the CUE or the RVW mode operation is automatically repeated to set the magnetic head at a leading edge of each information carrying portion of the magnetic tape and, after the head is set at the leading edge, the PLAY mode operation is automatically performed for a predetermined period.

To achieve the above object, the method according to the present invention comprises a first step of causing the mechanism controller to perform the CUE or RVW mode operation while detecting the output signal level from the magnetic head to find a leading edge of a portion of the magnetic tape where a piece of information is recorded, a second step of causing the mechanism controller to perform the PLAY mode operation which is initiated from a tape portion adjacent to and upstream of the leading edge for a predetermined time period after finding the leading edge, a third step of causing the mechanism controller to repeat the first and second steps until a manual stop command during the predetermined time period, and a fourth step of causing the mechanism controller to perform the PLAY mode operation even after the predetermined time period in case there is a manual stop command during the predetermined time period.

BRIEF DESCRIPTION OF THE DRAWINGS

The features and advantages of the present invention will now be more clearly understood from the following description taken in conjunction with the accompanying drawings in which like reference numerals designate similar or corresponding parts or members and in which.

DESCRIPTION OF THE PREFERRED EMBODIMENTS

Figure 1:
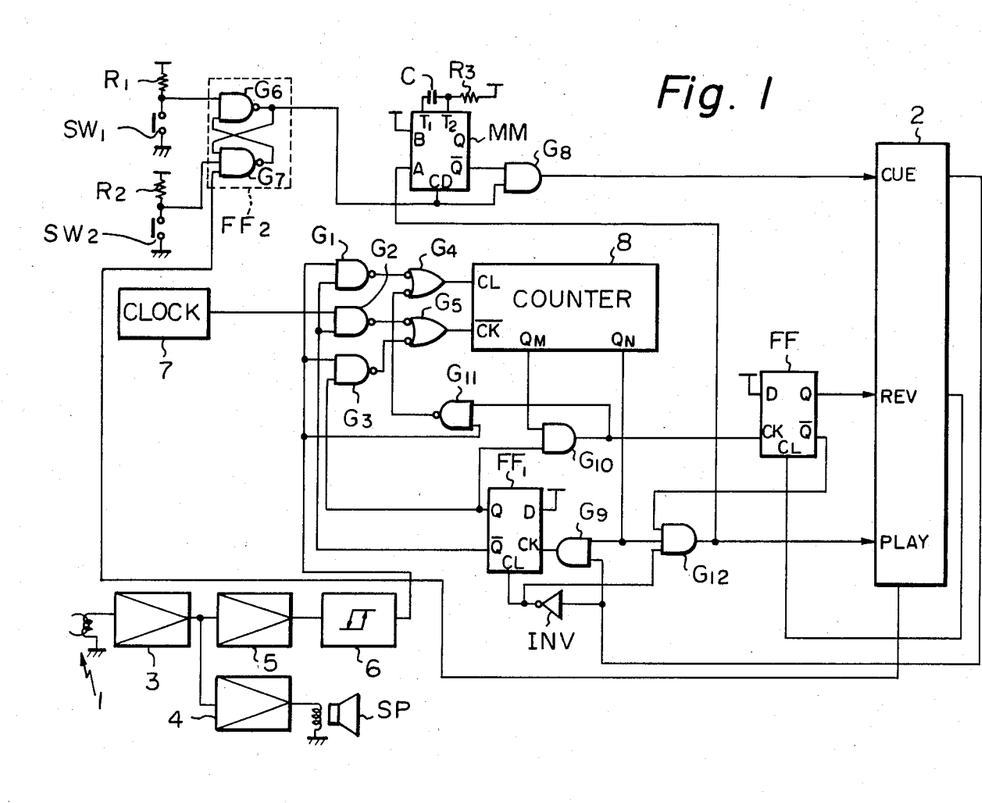
FIG. 1 is a schematic circuit diagram showing an example of a first type of the device for performing the method of the present invention.

Referring now to FIG. 1, there is shown an example of a first type of the device for performing the method of the present invention. This device is incorporated in a magnetic tape recorder and/or reproducer having a magnetic head 1, a tape transport (not shown) and a mechanism controller 2. The mechanism controller 2 is adapted to actuate the magnetic head 1 and the tape transport to perform selectively one of mode oeprations including the PLAY, CUE and RVW mode operations in response to command signals which will be described later.

In the device shown in FIG. 1, the output signal from the magnetic head 1, which corresponds to the information recorded in a magnetic tape passing by the head 1, is supplied to a equalizer amplifier 3. The output of the equalizer amplifier 3 is supplied to an amplifier 4 and another amplifier 5. The output of the amplifier 4 energizes a loudspeaker SP. The information carried by the magnetic tape is thus reproduced. On the other hand, the output of the other amplifier 5 is supplied to a schmitt trigger circuit 6. When an information carrying portion of the magnetic tape passes by the magnetic head 1 and, as a result, the output of the amplifier 5 changes behond the turn-on level and the turn-off level of the schmitt trigger circuit 6, the schmitt trigger circuit 6 produces a train of pulses. The amplifier 5 and the schmitt trigger circuit 6 form together a waveform transformer. The output pulses from the schmitt trigger circuit 6 are supplied to an input of each of two NAND gates G1 and G3. Clock pulses generated by a clock pulse generator 7 at predetermined periods are supplied to an input of another NAND gate G2. Another input of each of the NAND gates G1 and G2 is supplied with the $\bar{Q}$ output of a D type flip flop FF1 and another input of the NAND gate G3 is supplied with the Q output of the flip flop FF1.

A manually operated start switch SW1 and a manually operated stop switch SW2 are provided, which are respectively of non-lock type. Each of the switches SW1 and SW2 is connected at one end to ground and at the other end to a voltage supply (not shown) through a resistor R1 and R2, respectively. When the start switch SW1 is manually actuated and rendered conductive, the switch SW1 produces a low level signal which is supplied as a set signal to a set input of an R-S type flip flop circuit FF2. On the other hand, when the stop switch SW2 is manually operated and rendered conductive, the switch SW2 likewise produces a low level signal which is supplied as a reset signal to a reset input of the R-S type flip flop FF2. The R-S type flip flop FF2 is constituted by two NAND gates G6 and G7.

The reset input of the flip flop FF2 receives a reset signal as well from the mechanism controller 2, as will be described later.

When the R-S type flip flop FF2 is set by the low level signal from the start switch SW1, the flip flop FF2 produces a high level signal at its Q output i.e. the output of the gate G6. The high level signal from the Q output of FF2 is supplied to a clear input of a monstable multivibrator MM and an input of an AND gate G8. At this moment, the monostable multivibrator MM is released from its cleared state while supplying a high level signal from its $\bar{Q}$ output to another input of the gate G8. A high level signal is thus supplied from the output of the gate G8 to a CUE command input of the mechanism controller 2. The mechanism controller 2 starts to perform the CUE mode operation in response to the signal supplied to the CUE mode command input.

In case the magnetic head 1 is facing an information carrying tape portion immediately after the start of the CUE mode operation, then the D type flip flop FF1 is assuming its reset state so that another input of each of the gates G1 and G2 is supplied with a high level signal or blank portion detection command signal from the $\bar{Q}$ output terminal of the D type flip flop FF1. The clock pulses from the clock pulse generator 7 are then supplied to a clock input of a counter 8 through the NAND gates G2 and G5, while the pulse signals from the schmitt trigger circuit 6 are supplied to a clear input CL of the counter 8 through the NAND gates G1 and G4. The count content of the counter 8 does not increases to a large number as long as the magnetic head 1 moves along an information carrying tape portion, because of the clear pulses then being supplied to the clear input CL of the counter 8 from the schmitt trigger circuit 6.

If, however, a blank tape portion where no information is recorded reaches the magnetic head 1 and, as a result, the clear input CL of the counter 8 no longer receives any clear pulses from the schmitt trigger circuit 6, the count content of the counter 8 increases. When the count content of the counter 8 reaches a first predetermined number, the counter 8 delivers a high level signal from its output terminal $Q_N$. This high level signal is supplied to an input of an AND gate G9. At this moment, with a high level signal then being supplied from a CUE output terminal of the mechanism controller 2 to the other input of the gate G9, the gate G9 produces a high level signal which is supplied to a clock input CK of the D type flip flop FF1.

Upon receipt of the high level signal from the gate G9, the flip flop FF1 is set. When the flip flop FF1 is set, $\bar{Q}$ output of FF1 turns low while Q output of FF1 turns high, so that the gates G1 and G2 are respectively closed and the gate G3 is opened. When G1 and G2 are closed and G3 is opened, the counter 8 can receive at its clock input CK the pulses from the schmitt trigger circuit 6 through the gates G3 and G5.

If a leading edge of the subsequent information carrying tape portion reaches the magnetic head 1 when the counter 8 is under such circumstances, then the counter 8 again starts to count input pulses which are the pulses from the schmitt trigger circuit 6. The count content of the counter 8 accordingly further increases and reaches a second predetermined number which is larger than said first predetermined number. When the predetermined second number is reached, a high level signal is delivered from an output $Q_M$ of the counter 8 which corresponds to a bit of lower rank than that corresponding to the output $Q_N$. The high level signal from the output $Q_M$ is supplied to an input of an AND gate G10. The Q output level of the D type flip flop FF1 supplied to another input of the gate 10 is then high, so that the output level of the gate 10 turns high. At this instant, the output from the gate G10 sets a D type flip flop FF3 while raising an input level of a NAND gate G11. Another input of the gate 11 is then supplied with the pulse from the schmitt trigger circuit 6, which pulse reaches the clear input CL of the counter 8 through the gates G11 and G4 and clears the counter 8.

On the the hand, when the flip flop FF3 is set, the flip flop FF3 supplies a high level signal from its Q output to a review or RVW command input terminal of the mechanism controller 2 so that the magnetic tape recorder and/or reproducer starts to perform the RVW or review mode operation. At the same instant, a high level signal is supplied from a review output terminal of the mechanism controller 2 to a clear input of the D type flip flop FF3 while the CUE output level of the mechanism controller 2 supplied to an input of the inverting amplifier INV turns low. The flip flop FF3 is accordingly reset and another flip flop FF1, which receives at its clear input terminal the output of the inverting amplifier INV, is reset at the same time. The clock pulses from the clock pulse generator 7 and the pulses from the schmitt trigger circuit 6 are thus supplied to the clock input CK and the clear input CL of the counter 8, respectively.

If the magnetic head 1 comes onto a blank tape portion when the counter 8 is under such circumstances, the count content of the counter 8 again increases and reaches the first predetermined number. When the first predetermined number is reached, the output level at the output terminal $Q_N$ again turns high. At this instant, the $\bar{Q}$ output level from the flip flop FF3 and the output level from the inverting amplifier INV are both high and the $Q_N$ output level is also high so that an AND gate G12, which receives these three signals, produces a high level signal. The high level signal from the gate G12 is supplied to a PLAY mode command input terminal of the mechanism controller 2 and to a trigger input A of the monostable multivibrator MM. The magnetic tape recorder and/or reproducer then starts to perform the PLAY mode operation while the monostable multivibrator MM is triggered and the $\bar{Q}$ output level turns low. The $\bar{Q}$ output level from the monostable multivibrator turns high after a period which measures a value depending upon the characteristics of the attendant capacitor C and resistor R3. With the $\bar{Q}$ output level from the monostable multivibrator turning from low to high, the output level from the gate G8 supplied to the CUE command input of the mechanism controller 2 turns from low to high so that the magnetic tape recorder and/or reproducer again starts to perform the CUE mode operation.

The RVW, CUE and PLAY mode operations are thus automatically repeated until the stop switch SW2 is manually actuated. If the piece of information being reproduced is recognized as the desired one during the PLAY mode operation, then the stop switch SW2 is manually operated to stop the automatic repetition of the RVW, CUE and PLAY mode operations thereby to continue the PLAY mode operation. In case the R-S type flip flop FF2 is brought into its reset state with the stop switch SW2 being manually operated before the AND gate 12 produces a high level signal, the output level from the gate G8 will not change when the gate G12 produces a high level signal, because of the Q output of the flip flop FF2 supplied to one input of gate G8 then being at low level. Thus, no CUE mode operation command signal will not be given to the mechanism controller 2 in this case so that the recorder and/or reproducer will continue the PLAY mode operation.

Figures 2A, 2B:
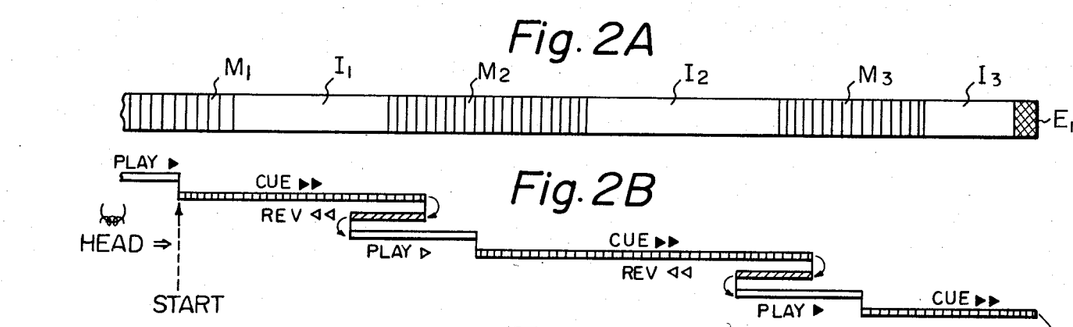
FIG. 2A is a plan view showing a portion of a magnetic tape.
FIG. 2B is an illustrative diagram for showing the relative movement of the magnetic head actuated by the device of FIG. 1 to the tape portion shown in FIG. 2A.
Figure 2C:
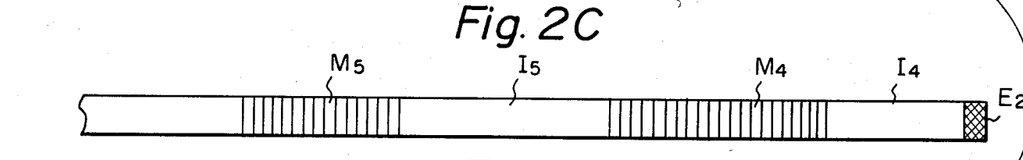
FIG. 2C is a plan view of another portion of the same magnetic tape as shown in FIG. 2A.
Figure 2D:
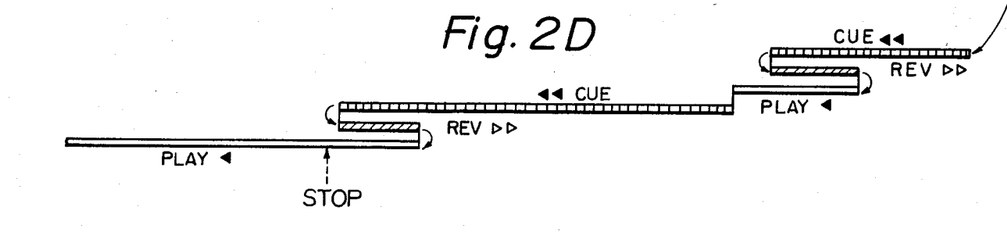
FIG. 2D is an illustrative diagram for showing the relative movement of the magnetic head actuated by the device of FIG. 1 to the tape portion shown in FIG. 2C.

The relative movement of the magnetic head 1 to the magnetic tape under the control of the device as shown in FIG. 1 will now be described with reference to FIGS. 2A to 2D. FIGS. 2A and 2C show a portion of a forward-side track of a magnetic tape and an adjacent portion of a reverse-side track of the same tape, respectively. FIGS. 2B and 2D show the relative movement of the head to the track portions shown in FIGS. 2A and 2C, respectively.

If the start switch S1 is manually actuated for selecting a desired piece of information when the PLAY mode operation is performed and the magnetic head is moving along an information carrying tape portion M1 toward the downstream end E1 of the forward-side track, then the CUE mode operation is initiated and the magnetic head passes by the information carrying tape portion M1 and an adjacent blank tape portion I1 at a high speed to reach the leading edge of the following information carrying tape portion M2. After the magnetic head 1 passed by the leading edge of the tape portion M2, the number of pulses counted by the counter 8 becomes equal to the predetermined number. After the predetermined number is reached, the RVW mode operation is performed so that the head 1 moves in the reversed direction toward the trailing edge of the blank tape portion I1. When the number of the clock pulses counted by the counter 8 becomes equal to said first predetermined number after the magnetic head 1 passed the trailing edge of the blank tape portion I1, the PLAY mode operation is initiated and the head 1 again starts to move toward the downstream end E1 of the forward-side track. After the PLAY mode operation is performed for a predetermined period, the CUE mode operation is again initiated so that the head 1 again starts to move toward the track end E1 at a high speed.

After the head 1 passed a blank tape portion I2, head 1 repeats similar movements to those described above on the tape region near the leading edge of another information carrying tape portion M3 and then passes another blank tape portion I3 to reach the forward-side track end E1. When the tape end E1 is reached, the operation mode of the tape recorder and/or reproducer is automatically changed to the reverse mode, that is to say, the head 1 is shifted to the reverse-side track end E2 of the magnetic tape and the CUE mode operation starts in the reversed direction so that the head 1 starts to move along the reverse-side track of the tape as shown in FIG. 2C toward an information carrying tape portion M4. The head moves along the reverse-side track of the tape from a blank portion I4 to an information carrying portion M4, a blank portion I5, and to an information carrying portion M5 while repeating, on each region near a leading edge of an information carrying portion M4 and M5, similar movements to those repeated along the forward-side track as shown in FIGS. 2A and 2B.

As described previously, the PLAY mode operation is performed only for a limited period to reproduce only an initial portion of each piece of information carried in the magnetic tape until a manual stop command is given.

If a piece of information carried in a tape portion M5 is recognized as the desired one when the initial portion of the piece of information is reproduced by the limited PLAY mode operation, then the stop switch S2 is manually operated to stop the automatic repetition of the CUE, RVW and PLAY mode operations. If the stop switch S2 is manually operated when the head 1 is moving along an information carrying tape portion M5 during the limited PLAY mode operation, the PLAY mode operation is continued even after the predetermined period. The automatic repetition of the above operations for selecting the desired piece of information is thus completed and the desired piece is then fully reproduced.

If the magnetic tape recorder and/or reproducer is arranged such that the magnetic head is shifted to the reverse-side track of the magnetic tape and the PLAY mode operation starts in the reversed direction and the counter 8 is cleared and the R-S type flip flop FF2 is reset after the magnetic head reached the tape end E1, then the PLAY mode operation can be initiated from the initial or upstream end E2 of the reverse-side track toward the opposite end (not shown).

The device of FIG. 1 for carrying out the method of the present invention is described above as being applied to a so-called automatic-reversal type magnetic tape recorder and/or reproducer. The device of FIG. 1 is applicable as well to a magnetic tape recorder and/or reproducer which can perform the PLAY mode operation only in one direction, if the counter 8 and the R-S type flip flop FF2 are arranged such that the counter 8 is cleared and flip flop FF2 is reset when the magnetic head reaches the tape end E1.

In a magnetic tape recorder and/or reproducer provided with the device as shown in FIG. 1, only two manual operations to the switches SW1 and SW2 are necessitated for selecting a desired information piece. The desired piece can be found only in a short time. The selected information piece is reproduced without its initial portion being not reproduced. It is possible to adjust the time period during which the limited PLAY mode operation is performed for the initial portion of an information piece, by adjusting the characteristics of the capacitor C and the resistor R3 associated with the monostable multivibrator MM. The electric circuits shown in FIG. 1 may be readily provided in the form of an solid stage integrated circuit, since data are processed only in the form of digits in the electric circuits.

Figure 3:
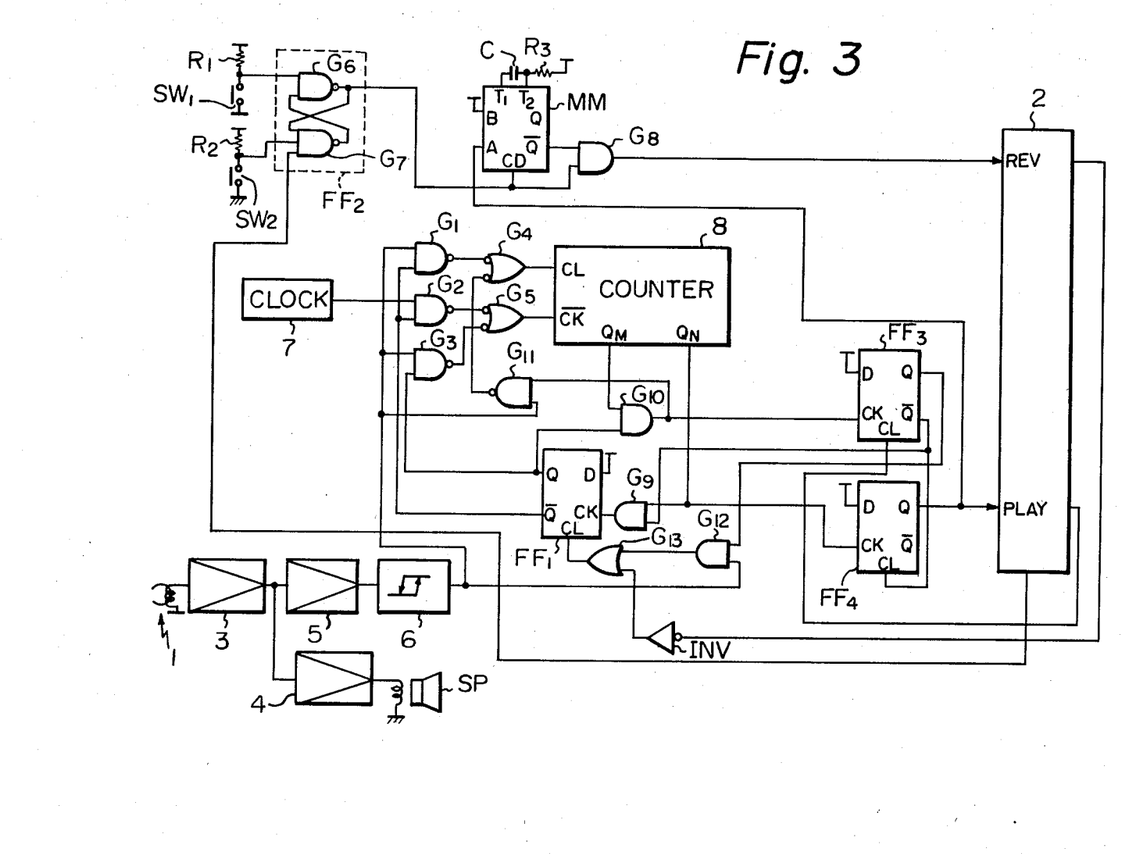
FIG. 3 is a schematic circuit diagram showing an example of a second type of the device for performing the method of the present invention.

In FIG. 3, there is shown another circuit arrangement or device which is used for carrying out the method of the present invention. In a magnetic tape recorder and/or reproducer incorporated with the device of FIG. 3, the PLAY mode operations limited for time are carried out automatically in succession in the upstream direction of the magnetic tape, as closely described later.

In the circuit arrangement as shown in FIG. 3, parts or members designated by reference numerals 1 to 7 are substantially the same as those shown in FIG. 1. Switches SW1 and SW2 and an R-S flip flop FF2 are also of the same constitution as those shown in FIG. 1.

When the start switch SW1 of the device shown in FIG. 3 is manually actuated and rendered conductive and, as a result, the R-S type flip flop FF2 is set by the low level signal from the switch SW1, the flip flop FF2 produces a high level signal at its Q output i.e. the output of the gate G6. The high level signal from the Q output of the flip flop FF2 is supplied to a clear input of a monostable multivibrator MM and an input of an AND gate G8. At this moment, the monostable multivibrator MM is released from its cleared state while supplying a high level signal to another input of the gate G8. A high level signal is thus supplied from the output of the gate G8 to the review mode operation command input RVW of the mechanism controller 2 so that the magnetic tape recorder and/or reproducer starts to perform the review or RVW mode operation.

In case the magnetic head 1 is facing an information carrying tape portion immediately after the start of the RVW mode operation of the magnetic tape recorder and/or reproducer, a D type flip flop FF1 is assuming its reset state so that an input of each of NAND gates G1 and G2 is supplied with a high level signal or blank portion detection command signal from a $\overline{Q}$ output of the D type flip flop FF1. The clock pulses from the clock pulse generator 7 are then supplied to a clock input CK of a counter 8 through the NAND gate G2 and another NAND gate G5, while the pulse signals from the schmitt trigger circuit 6 are supplied to a clear input CL of the counter 8 through the NAND gate G1 and another NAND gate G4. The count content of the counter 8 does not increases to a large number as long as the magnetic head 1 faces an information carrying tape portion, because of the clear pulses then being supplied to the clear input CL of the counter from the schmitt trigger circuit 6.

If, however, a blank tape portion where no information is recorded reaches the magnetic head 1 and, as a result, the clear input CL of the counter 8 no longer receives any pulse signals from the schmitt trigger circuit 6, the count content of the counter 8 increases. When the count content of the counter 8 reaches a first predetermined number, the counter 8 delivers a high level signal from its output terminal $Q_N$. This high level signal is supplied to an input of an AND gate G9. At this moment, with a high level signal being supplied from a $\overline{Q}$ output of another D type flip flop FF3 to the other input of the AND gate G9, the gate G9 produces a high level signal which is supplied to a clock input CK of the D type flip flop FF1.

Upon receipt of the high level signal from the gate G9, the flip flop FF1 is set so that its $\overline{Q}$ output turns low and its Q output turns high, respectively. The gates G1 and G2 are accordingly closed while the gate G3 is opened. When G1 and G2 are closed and G3 is opened, the counter 8 can receive at its clock input CK the pulses from the schmitt trigger circuit 6 through the opened gate G3 and the NAND gate G5.

If a leading edge of the following information carrying tape portion reaches the magnetic head 1 when the counter 8 is under such circumstances, then the counter 8 again starts to count input pulses which are then the pulses from the schmitt trigger circuit 6. The count content of the counter 8 accordingly further increases and reaches a second predetermined number which is larger than said first predetermind number. When the second predetermined number is reached, a high level signal is delivered from an output $Q_M$ of the counter 8 which corresponds to a bit of lower rank than that corresponding to the output $Q_N$. The high level signal from the output $Q_M$ is supplied to an input of an AND gate G10. The Q output level from the D type flip flop FF1 supplied to another input of the gate 10 is then high, so that the output level from the gate G10 turns high. At this instant, the output from the gate G10 sets the D type flip flop FF3 while raising an input level of a NAND gate G11. Another input of the gate G11 is then supplied with the pulse from the schmitt trigger circuit 6, which pulse reaches the clear input CL of the counter 8 through the gate G11 and G4 and clears the counter.

On the other hand, when the flip flop FF3 is set, a high level signal is supplied from the Q output of FF3 to an input of an AND gate G12. The pulses form the schmitt trigger circuit 6 are then supplied to the clear input CL of the flip flop FF1 through the gate G12 and an OR gate G13 so that the D type flip flop FF1 is reset. After the flip flop FF1 is reset, the clock input and the clear input of the counter 8 are supplied with the clock pulses from the clock pulse generator 7 and the pulses from the schmitt trigger circuit 6, respectively. On the other hand, when the flip flop FF3 is set, the $\overline{Q}$ output of FF3 supplied to a clear input of another D type flip flop FF4 turns low so that the flip flop FF4 is released from its reset state.

If the magnetic head 1 comes onto a blank tape portion when the counter is under such circumstances, the count content of the counter 8 again increases to reach the first predetermined number. When the first predetermined number is reached, the output level at the output terminal $Q_N$ again turns high. At this moment, the clock input terminal CK of the flip flop FF4 connected to the terminal $Q_N$ receives the high level signal and the flip flop FF4 is set, so that a high level signal is supplied from the Q output of FF4. This high level signal from the Q output of FF4 is supplied to the PLAY mode operation command input terminal of the mechanism controller 2 so that the magnetic tape recorder and/or reproducer starts to perform the PLAY mode oepration. When the PLAY mode operation is initiated, a high level signal is supplied from the PLAY output of the mechanism controller 2 to the clear input of the flip flop FF3 so that the flip flop FF3 is reset and its $\overline{Q}$ output level turns high. The flip flop FF4 is also reset, in response to the high level signal supplied to its clear input from the $\overline{Q}$ output of FF3. On the other hand, when the PLAY mode operation is initiated, a low level signal is supplied from the RVW output of the mechanism controller 2 to an inverting amplifier INV so that the inverting amplifier INV produces a high level signal. The high level output signal from the inverting amplifier INV is supplied through the gate G13 to the clear input CL of the D type flip flop FF1 so that the flip flop FF1 becomes unable to assume its set state.

The high level signal from the Q output of the flip flop FF4 is as well supplied to the trigger input A of the monostable multivibrator MM. When the monostable multivibrator MM is triggered by the signal from FF4, the $\overline{Q}$ output level of MM turns low. The $\overline{Q}$ output level from the monostable multivibrator MM turns high after a period which measures a value depending upon the characterestics of the attendant capacitor C and resistor R3. With the $\overline{Q}$ output level from the monostable multivibrator MM turning from low to high, the output level from the gate G8 supplied to the RVW mode operation command input of the mechanism controller 2 turns from low to high so that the magnetic tape recorder and/or reproducer again starts to perform the RVW mode operation.

In case the piece of information being reproduced is recognized as the desired one during the limited PLAY mode operation, the stop switch SW2 is manually operated to stop the repetition of the RVW and PLAY mode operations thereby to continue the PLAY mode operation. If the R-S type flip flop FF2 is brought into its reset state with the stop switch being manually operated before the $\overline{Q}$ output level from the monostable multivibrator MM turns from low to high, the output level form the gate G8 will not change when the $\overline{Q}$ output level from the monostable multivibrator MM turns from low to high, because of the Q output of the flip flop FF2 supplied to one input of the gate G8 then being at low level. Thus, no review or RVW mode command signal is given to the mechanism controller 2 upon the lapse of the predetermined period so that the PLAY mode operation is continued even after the predetermined period. The automatic repetition of the RVW and PLAY mode operations for selecting the desired inormation piece is thus stopped and the thus selected information piece is fully reproduced.

Figure 4A:
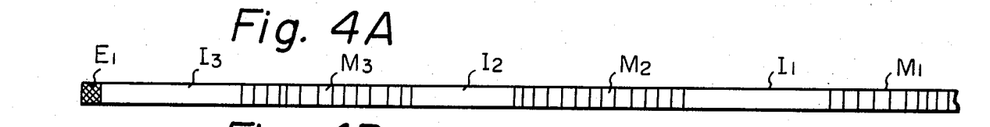
FIG. 4A is a plan view of a portion of a magnetic tape.
Figure 4B:
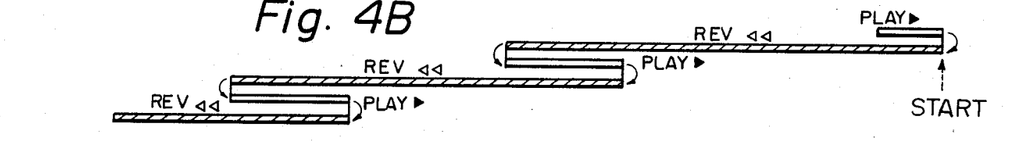
FIG. 4B is an illustrative diagram for showing the relative movement of the magnetic head actuated by the device of FIG. 3 to the tape portion shown in FIG. 4A.
Figure 4C:
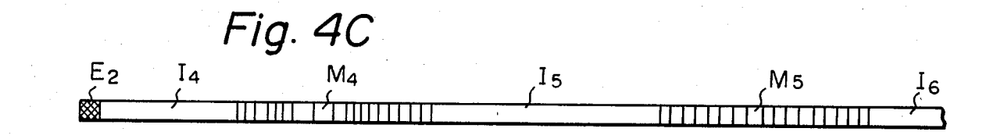
FIG. 4C is a plan view of another portion of the same magnetic tape as shown in FIG. 4A.
Figure 4D:
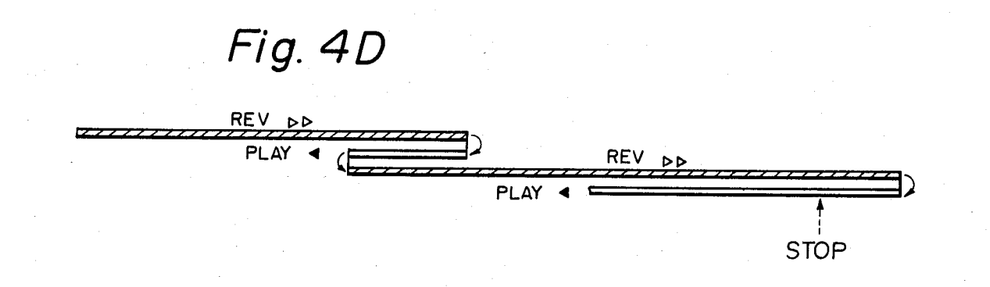
FIG. 4D is an illustrative diagram for showing the relative movement of the magnetic head actuated by the device of FIG. 3 to the tape portion shown in FIG. 4C.

The relative movement of the magnetic head 1 to the magnetic tape under the control of the device shown in FIG. 3 will now be described with reference to FIGS. 4A to 4D. FIGS. 4A and 4C show a portion of a forward-side track of a magnetic tape and an adjacent portion of a reverse-side track of the same tape, respectively. FIGS. 4B and 4D show the relative movement of the magnetic head to the track portions shown in FIGS. 4A and 4C, respectively.

If the start switch S1 is manually actuated when the PLAY mode operation is performed and the magnetic head is moving along an information carrying tape portion M1 toward an downstream end (not shown) of the forward-side track of the tape, then the RVW mode operation is initiated and the magnetic head passes by the information carrying tape portions M1 and M2 and a blank tape portion I1 at a high speed in the upstream or backward direction to reach the trailing edge of a blank tape portion I2. After the magnetic head passed the trailing edge of the tape portion I2, the number of the clock pulses counted by the counter becomes equal to said first predetermined number. When the first predetermined number is reached, the PLAY mode operation is again initiated and the magnetic head again starts to move in the downstream or forward direction toward the downstream end (not shown) of the forward-side track. After the PLAY mode operation is performed for a predetermined period, the RVW mode operation is again initated so that the magnetic head again starts to move at a high speed toward the upstream end E1 of the tape.

After the magentic head passed the blank tape portion I2 and an information carrying tape portion M3, the magnetic head repeats similar movements to those described above on the tape region near the trailing edge of a blank tape portion I3 and then reaches the upstream end E1 of the forward-side track of the tape. When the end E1 is reached, the opertion mode of the magnetic tape recorder and/or reproducer is automatically changed to the reverse mode, that is to say, the magnetic head is shifted to the adjacent reverse-side track end E2 and the RVW mode operation starts in the reversed direction so that the magnetic head starts to move along the reverse-side track of the tape as shown in FIG. 4C toward the upstream end (not shown) of the reverse-side track. The magnetic head moves along the reverse-side track of the tape from the blank portion I4 to an information carrying portion M4, a blank portion I5, and to an information carrying portion M5 while repeating, on each region near a trailing edge of each blank portion I5 and I6, similar movements to those repeated on the regions near the trailing edges of the blank tape portions I2 and I3.

As described previously, the PLAY mode operation is performed only for a predetermined period to reproduce only an initial portion of each information piece carried in the magnetic tape until the stop switch is manually operated. If the stop switch SW2 is operated during the limited PLAY mode operation, the automatic repetition of the RVW and PLAY mode operations is stopped and the PLAY mode operation is continued so that the selected information piece is fully reproduced.

The device of FIG. 3 for carrying out the method of the present invention is described above as being applied to a so-called automatic-reversal type magnetic tape recorder and/or reproducer. The device of FIG. 3 however is applicable as well to a magnetic tape recorder and/or reproducer which can perform the PLAY mode operation only in one direction, if the counter 8 and the R-S type flip flop FF2 are arranged such that the counter 8 is cleared and flip flop FF2 is reset, respectively, when the magnetic head reaches the initial or upstream end of the magnetic tape.

The device as shown in FIG. 3 has similar advantages to those as described above with respect to the device of FIG. 1. That is to say, in a magnetic tape recorder and/or reproducer provided with the device as shown in FIG. 3, only two manual operations to the switches SW1 and SW2 are necessitated for selecting a desired information piece. The desired piece can be found only in a short time. The selected information piece is reproduced without its initial portion being not reproduced. It is possible to adjust the time period during which the limited PLAY mode operation is performed for the initial portion of an information piece, by adjusting the characteristics of the capacitor C and the resistor R3 associated with the monostable multivibrator MM. The electric circuits shown in FIG. 3 may be readily provided in the form of an solid stage integrated circuit, since data are processed only in the form of digits in the electric circuits.

Figure 5:
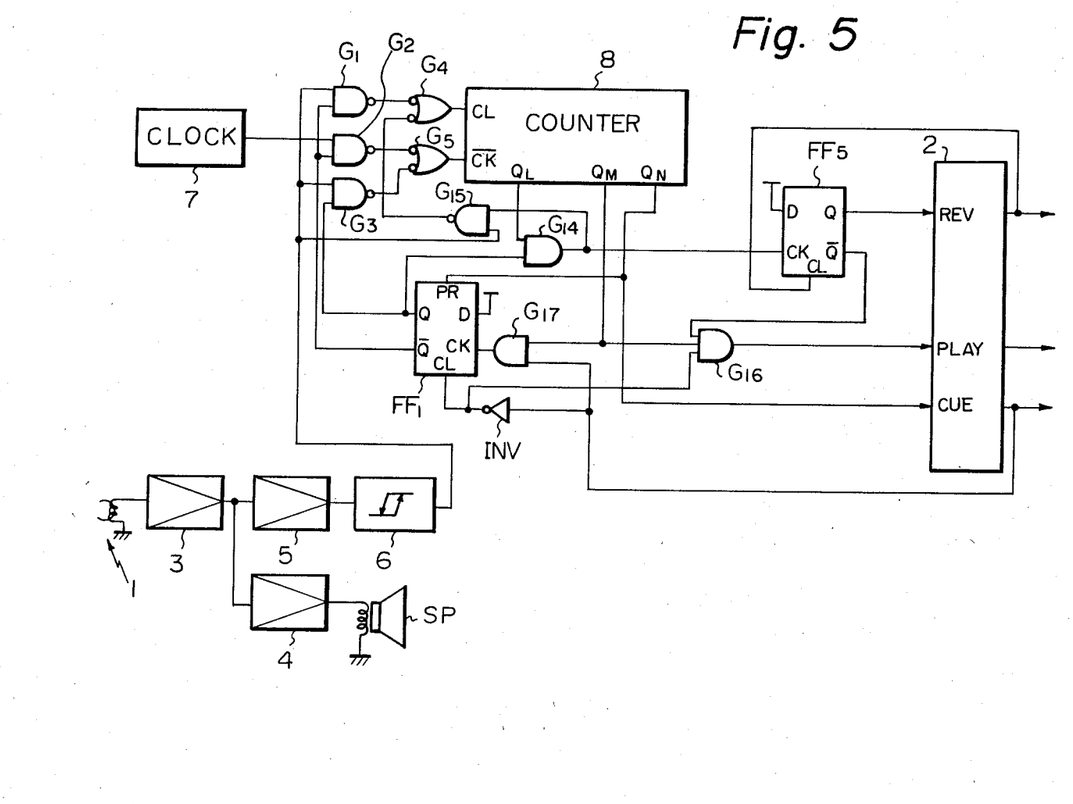
FIG. 5 is a schematic circuit diagram showing an example of a third type of the device for performing the method of the present invention.

In FIG. 5, there is shown another circuit arrangement or device for carrying out the method of the present invention. In a magnetic tape recorder and/or reproducer incorporated with the device of FIG. 5, the arrangement is such that the magnetic head jumps over a blank tape portion for time saving purposes.

In the circuit arrangement as shown in FIG. 5, the parts or members designated by reference numerals 1 to 7 are substantially of the same constitution as those shown in FIGS. 1 and 3. The output pulses from the schmitt trigger circuit 6 are supplied to an input of each of two NAND gates G1 and G3. Clock pulses generated by the clock pulse generator 7 are supplied to an input of another NAND gate G2. Another input of each of the gates G1 and G2 is supplied with the $\bar{Q}$ output of a D type flip flop FF1 and another input of the gate G3 is supplied with the Q output of the flip flop FF1.

When the magnetic head 1 is moving along an information carrying tape portion during the PLAY mode operation, the D type flip flop FF1 is assuming its reset state so that an input of each of the NAND gates G1 and G2 is supplied with a high level signal or blank portion detection command signal from the $\bar{Q}$ output of the flip flop FF1. The clock pulses from the clock pulse generator 7 are then supplied to a clock input CK of a counter 8 through the NAND gate G2 and another NAND gate G5, while the pulses from the schmitt trigger circuit 6 are supplied to a clear input CL of the counter 8 through the NAND gate G1 and another NAND gate G4. The count content of the counter 8 does not increases to a large number as long as the magnetic head 1 faces an information carrying tape portion, because of the clear pulses then being supplied to the clear input CL of the counter 8 from the schmitt trigger circuit 6.

After a blank tape portion reached the magnetic head 1, the clear input CL of the counter 8 no longer receives any pulse signals from the schmitt trigger circuit 6 so that the count content of the counter 8 increases. The count content of the counter 8 reaches a first predetermined number after a predetermined period T1 is lapsed, which period T1 measures a value depending upon the period of the clock pulses. When the count content of the counter 8 reaches the first predetermined number, the counter delivers a high level signal from its output terminal $Q_N$. This high level signal is supplied to the preset input terminal PR of the flip flop FF1 and to the CUE mode operation command input of the mechanism controller 2 so that the CUE mode operation is initiated. At the same instant, a high level signal is supplied from the CUE output terminal of the mechanism controller 2 to an input of an inverting amplifier INV, so that the output of the inverting amplifier supplied to the clear input CL of the flip flop FF1 turns low and the flip flop FF1 is thus set. When the flip flop FF1 is set, the $\bar{Q}$ output level of FF1 turns low and the Q output turns high. The gates G1 and G2 are accordingly closed and the gate G3 is opened. When G1 and G2 are closed and G3 is opened, the counter 8 can receive at its clock input CK the pulses from the schmitt trigger circuit 6 through the opened gate G3 and the gate G5.

If a leading edge of the following information carrying tape portion reaches the magnetic head 1 when the counter 8 is under such circumstances, then the counter 8 again starts to count input pulses which are then the pulses from the schmitt trigger circuit 6. The count content of the counter 8 accordingly further increases and reaches a second predetermined number which is larger than said first predetermined number. When the second predetermined number is reached, a high level signal is delivered from an output $Q_L$ of the counter 8 which corresponds to a bit of lower rank than that corresponding to the output $Q_N$. This high level signal is supplied to an input of an AND gate G14. The Q output from the flip flop FF1 supplied to another input of the gate G14 is then high, so that the output level from the gate G14 turns high. At this instant, the output from the gate G14 sets a D type flip flop FF5 while raising an input level of a NAND gate G15. Another input of the gate G15 is supplied with the pulse from the schmitt trigger circuit 6, which pulse reaches the clear input CL of the counter 8 through the gates G15 and G4 and clears the counter 8.

On the other hand, when the flip flop FF5 is set, a high level signal is supplied from the Q output of FF5 to the RVW mode operation command input of the mechanism controller 2 so that the magnetic tape recorder and/or reproducer starts the RVW mode operation. Then, on the one hand, a high level signal is delivered from the RVW output terminal of the mechanism controller 2 to the clear input of the flip flop FF5 so that this flip flop FF5 is reset, and, on the other hand, the CUE output level from the mechanism controller 2 turns low so that the output level from the inverting amplifier INV turns high and the flip flop FF1 is also reset. The clock pulses from the clock pulse generator 7 and the pulses from the schmitt trigger circuit 6 are thus supplied to the clock input and the clear input, respectively, of the counter 8.

If the magnetic head 1 comes onto a blank tape portion when the counter 8 is under such circumstances, the count content of the counter again increases. After the lapse of a predetermined period T2, the count content reaches a third predetermined number which is smaller than the first predetermined number so that the level at the output terminal $Q_M$ of the counter 8 turns high. At this instant, the $\bar{Q}$ output level from the flip flop FF5 and the output level from the inverting amplifier INV are both high and the output level from the terminal $Q_M$ is also high, so that an AND gate G16, which receives these three signals, produces a high level signal. The high level signal from the gate G16 is supplied to the PLAY mode operation command input of the mechanism controller 2 so that the magnetic tape recorder and/or reproducer starts to perform the PLAY mode operation. The magnetic head thus jumps over a blank tape portion automatically.

If the CUE mode operation is initiated in response to a manual command to search an information carrying tape portion and the magnetic head moves along a blank tape portion for a certain period during the CUE mode operation, the counter 8 delivers a high level signal from its output terminal $Q_M$. In this case, an AND gate G17 then produces a high level signal which sets the flip flop FF1 so that the magnetic tape recorder and/or reproducer starts to detect an information carrying tape portion.

The relative movement of the magnetic head 1 to the magnetic tape under the control of the device as shown in FIG. 5 will now be described with reference to FIGS. 6A and 6B and 7A to 7D.

Figure 6A:
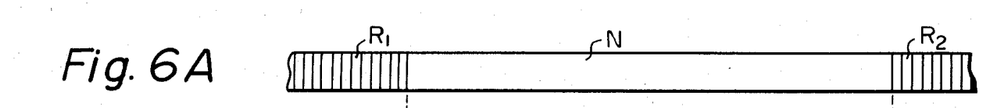
FIG. 6A is a plan view showing a portion of a magnetic tape.
Figure 6B:
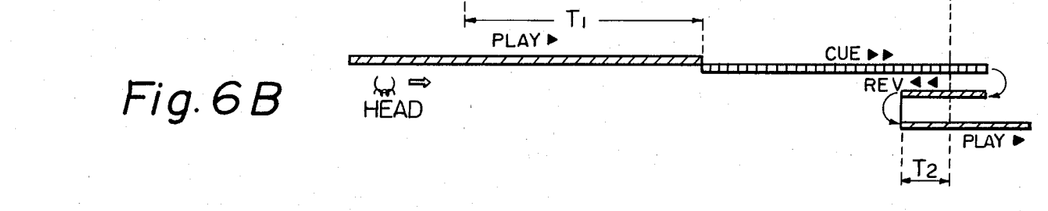
FIG. 6B is an illustrative diagram for showing the relative movement of the magnetic head actuated by the device of FIG. 5 to the tape portion shown in FIG. 6A.

FIG. 6A shows a portion of a magnetic tape which has a blank portion N between two information carrying portions R1 and R2. The magnetic head moves along the magnetic tape and passes the trailing edge of the first information carrying portion R1 during the PLAY mode operation. The magnetic head moves along the initial portion of the blank portion N only for a predetermined period T1 after the head passed the trailing edge of the portion R1. After the lapse of the period T1, the CUE mode operation starts and the magnetic head comes onto the next information carrying portion R2. The RVW mode operation starts when the counter counts a predetermined number of the pulses from the schmitt trigger circuit 6 so that the magnetic head moves back toward the blank portion N. The magnetic head passes the trailing edge of the blank portion N in the upstream direction during the RVW mode operation. The RVW mode operation is performed for a second predetermined period after the head passed the trailing edge of the blank portion N. Then the PLAY mode operation is again initiated and the head again moves toward the second information carrying portion R2.

Figure 7A:
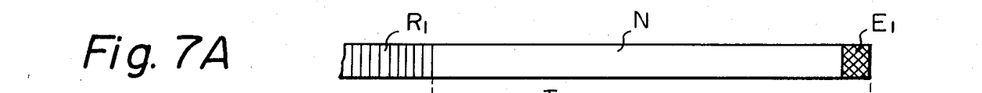
FIGS. 7A and 7C are respectively plan views of different portions of a magnetic tape.
Figures 7B, 7C:
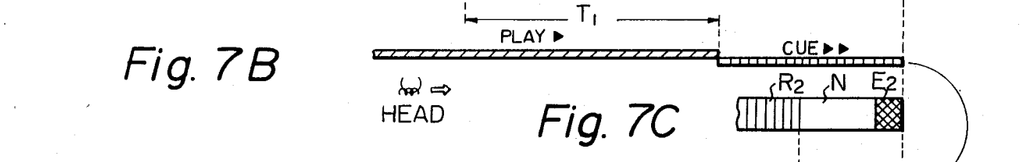
FIGS. 7B and 7D are respectively illustrative diagrams for showing the relative movement of the magnetic head to the magnetic tape portions shown in FIGS. 7A and 7C.
Figure 7D:
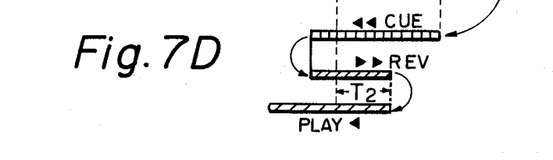

FIGS. 7A and 7C show a forward-side track of a magnetic tape and an adjacent reverse-side track of the same tape, respectively. The forward-side track as shown in FIG. 7A has a blank portion N extending to the downstream end E1 thereof and the reverse-side track as shown in FIG. 7C has a blank portion N extending from its upstream end E2 adjacent to the downstream end E1 of the forward-side track. In the case of the magnetic tape as shown in FIGS. 7A and 7C, the magnetic head reaches the forward-side track end E1 during the CUE mode operation. The head is then shifted to the reverse-side track end E2 and the CUE mode operation is performed in the reversed direction.

The magnetic head jumps over the blank portion N along the reverse-side track as well.

The PLAY mode operation can be initiated from the reverse-side track end E2 in the reversed direction, if the magnetic tape recorder and/or reproducer incorporated with the device of FIG. 5 is arranged such that, after the magnetic head reaches the forward-side track end E1, the magnetic head is shifted to the reverse side track, the PLAY mode operation is initiated in the reversed direction, the counter is cleared, and the D type flip flop FF1 is reset.

The device of FIG. 5 is described above as being applied to a so-called automatic-reversal type magnetic recorder and/or reproducer. The device of FIG. 5 is applicable as well to a magnetic tape recorder and/or reproducer in which the PLAY mode operation can be perfomed only in one direction, if the counter 8 and the D type flip flop FF1 are arranged such that when the magnetic head reaches the initial or upstream end of the magnetic tape the counter 8 is cleared and the flip flop FF1 is reset.

What is claimed is:

1. A device for selecting a desired piece of information recorded on a magnetic tape having blank portions and recorded portions and mounted in a tape player system having a magnetic head and a tape transport structure adapted to perform one of operational modes including a PLAY mode for a normal playback of recorded information, a CUE mode and a REVIEW mode in which the tape is moved respectively forward and backward at a speed higher than a normal playback speed while said magnetic head is engaged for picking up the recorded information on the magnetic tape, said device comprising:
    (a) means for generating an audio pulse train signal in response to an output signal of said magnetic head, which audio pulse train signal has a plurality of pulses corresponding to high level portions of recorded information for each of said recorded portions;
    (b) a clock signal generating means for generating a clock signal of a predetermined frequency;
    (c) a counter means having a clock input terminal and a reset input terminal;
    (d) a first switch means for connecting said clock signal and said audio pulse train signal respectively to said clock input terminal and said reset input terminal of said counter means;
    (e) a second switch means for connecting said audio pulse train signal to said clock input terminal of said counter means; and
    (f) a control means having a first operational means for selecting said CUE mode and activating said first switch means to detect that a blank portion is present when a content of said counter means has reached a predetermined value due to absence of said audio pulse train signal at said reset terminal and activating said second switch means when a blank portion is detected, said control means having a second operational means for selecting said REVIEW mode when a leading edge of a next one of recorded portions is detected from the content of the counter means when the second switch means is activated during said CUE mode and thereafter activating said first switch means during said REVIEW mode to detect a blank portion, and said control means having a third operational means for selecting said PLAY mode when the blank portion is detected from the content of the counter means during REVIEW mode in which the first switch means is activated.

2. A device as claimed in claim 1, wherein said control means activates said first operational means when a predetermined time has passed after the selection of PLAY mode and repeatably activates said first, second and third operational means unless a stop command signal is generated by an operator of said tape player system.

3. A device for selecting a desired piece of information recorded on a magnetic tape having blank portions and recorded portions, said tape being mounted in a tape player system having a magnetic head and a tape transport structure adapted to perform one of operational modes including PLAY mode and REVIEW mode, said tape being moved backward during said REVIEW mode at a speed higher than a normal playback speed while said magnetic head is engaged for picking up the recorded information on the magnetic tape, said device comprising:
  (a) means for generating an audio pulse train signal in response to an output signal of said magnetic head, which audio pulse train signal has a plurality of pulses corresponding to high level portions of recorded information for each of said recorded portions;
  (b) a clock signal generating means for generating a clock signal of a predetermined frequency;
  (c) a counter means having a clock input terminal and a reset input terminal;
  (d) a first switch means for connecting said clock signal and said audio pulse train signal respectively to said clock input terminal and said reset input terminal of said counter means;
  (e) a second switch means for connecting said audio pulse train signal to said clock input terminal of said counter means; and
  (f) control means having a first operational means for selecting said REVIEW mode and activating said first switch means to detect that a blank portion is present when a content of said counter means has reached a predetermined value due to absence of said audio pulse train signal at said reset terminal, and said first operational means actuating said second switch means to detect a recorded portion when the blank portion is detected and thereafter actuating said first switch means to detect another blank portion when the recorded portion is detected during said REVIEW mode, and a second operational means for selecting said PLAY mode when said another blank portion is detected.

4. A device as claimed in claim 3, in which said control means actuates said first operational means when a predetermined time has passed after said PLAY mode is selected and repeatedly actuates said first and second operational means unless a stop command signal is generated by an operator of said tape player system.

5. A blank skip control device for use with a tape player system for playing a magnetic tape having blank portions and recorded portions, said tape player system having a magnetic head and a tape transport structure adapted to perform one of operational mode including a PLAY mode for a normal playback of recorded information, a CUE mode and a REVIEW mode in which the tape is moved respectively forward and backward at a speed higher than a normal playback speed while said magnetic head is engaged for picking up recorded information on the magnetic tape, comprising:
  a first detection means for detecting a blank portion of the magnetic tape in which no information is recorded;
  a second detection means for detecting a recorded portion of the magnetic tape in which a piece of information is recorded;
  a control means having a first operational means for activating said first detection means when said PLAY mode is selected, a second operational means for selecting said CUE mode and activating said second detection means when a blank portion is detected by said first detection means during said PLAY mode, a third operational means for selecting said REVIEW mode and activating said first detection means when a recorded portion is detected by said second detection means during said CUE mode, and a fourth operational means for selecting said PLAY mode when the blank portion is detected by said first detection means during said REVIEW mode.

6. A device as claimed in claim 5, further including a circuit for generating an audio pulse train signal in response to an output signal of said magnetic head, which audio pulse train signal having a plurality of pulses corresponding to high level portions of recorded information for each of said recording portions, a clock signal generator for generating a clock signal of a predetermined frequency, and a counter having a clock input terminal and a reset input terminal, and in which said first detection means includes a first switch means for connecting said clock signal to said clock input terminal and connecting said audio pulse signal to said reset input terminal so that presence of a blank portion is detected when a content of the counter has reached a predetermined number due to absence of said audio pulse train signal at said reset terminal, and said second detection means includes a second switch means for connecting said audio pulse train signal to said clock input terminal of said counter so that presence of a recorded portion is detected when the content of the counter has reached a second predetermined number.

* * * * *